United States Patent [19]

Spencer

[11] 4,137,564
[45] Jan. 30, 1979

[54] INTELLIGENT COMPUTER DISPLAY TERMINAL HAVING EAROM MEMORY

[75] Inventor: David H. Spencer, Lebanon, N.J.

[73] Assignee: Burroughs Corporation, Detroit, Mich.

[21] Appl. No.: 826,513

[22] Filed: Aug. 22, 1977

[51] Int. Cl.² .................. G06F 3/04; G06F 3/14; G06F 13/00
[52] U.S. Cl. ................................................. 364/200
[58] Field of Search ... 364/200 MS File, 900 MS File; 365/94, 228

[56] References Cited

U.S. PATENT DOCUMENTS

| | | | |
|---|---|---|---|
| 3,631,403 | 12/1971 | Asbo et al. | 364/200 |
| 3,748,452 | 7/1973 | Ruben | 364/200 |
| 3,760,375 | 9/1973 | Irwin et al. | 364/200 |
| 3,899,776 | 8/1975 | Sicko et al. | 364/900 |
| 3,959,776 | 5/1976 | Morley | 364/900 |
| 3,971,925 | 7/1976 | Wenninger et al. | 364/900 |
| 3,973,244 | 8/1976 | Lovercheck et al. | 364/200 |
| 4,019,175 | 4/1977 | Nakao et al. | 364/900 |
| 4,039,785 | 8/1977 | Ziemann | 365/94 X |
| 4,058,850 | 11/1977 | Sheikh | 364/900 |
| 4,064,490 | 12/1977 | Nagel | 364/900 |

OTHER PUBLICATIONS

"Finalists Selected in General Instrument EAROM Applications Circuit Design Contest" in Electronic Engineering Times, Jun. 13, 1977, pp. 32-35 and 64.

Primary Examiner—Melvin B. Chapnick
Attorney, Agent, or Firm—Carl Fissell, Jr.; Robert L. Kaner; Kevin R. Peterson

[57] ABSTRACT

A computer terminal for providing a visual display of linguistic characters in response to character data information from an external computer. The computer display terminal can be semipermanently configured in response to externally supplied configuration information. The terminal includes a microprocessor unit formed by a microprocessor, a ROM for instruction codes and a RAM for temporary data storage. A data communications channel interfaces with the microprocessor unit, receives the character information from the external computer, and provides such information to the microprocessing unit for storage in its RAM. A CRT or other display interfaces with the microprocessor unit and visually displays character information stored in the RAM. A keyboard or other input interfaces with the microprocessor unit and provides a means for inputting externally supplied terminal configuration information. An EAROM interfaces with the microprocessor unit and semipermanently stores configuration information received therefrom. The EAROM is an electrically alterable memory, is nondestructive at power off, and supplies its stored configuration information to the microprocessor unit upon demand. The microprocessor unit of the display terminal also interfaces with an external printer for providing hard copies, an external magnetic card reader for providing an additional input device, and an external magnetic tape unit for providing an additional input/output device.

10 Claims, 2 Drawing Figures

INTELLIGENT COMPUTER DISPLAY TERMINAL HAVING EAROM MEMORY

BACKGROUND OF THE INVENTION

1. Field of the Invention

This invention relates in general to computer display terminals and more particularly to such terminals having internal electronic data processing capabilities.

2. Description of the Prior Art

Computer display terminals can be used to provide visual computer output. Most often computer display terminals are used as part of the main operator's control console of external computers or as remotely located display terminals for external computers. The external computers to which the display terminals are connected are generally of a wide variety of sizes and configurations.

Computer display terminals typically have a data communications channel for communicating with the external computer and a display that provides a visual indication of linguistic characters, such as alphanumerics, in response to data received from the external computer via the data communications channel. The data communications channel can have various configurations such as modem or direct connection, synchronous or asynchronous, and can have a variety of bit rates. The visual display can have various configurations such as a cathode ray tube display or a matrix of discretely and selectively energizable light sources. Generally, such display terminals also include a keyboard such that the operator can input information to the terminal for transmission to the external computer via the data communications channel. Rather frequently, a display terminal will have the capability to directly interface with external peripherals such as printers and magnetic tape units.

Recently, such computer display terminals have been implemented using microprocessor units within the terminal. Such terminals are referred to as intelligent display terminals and the microprocessor units include a data processor, a RAM and a ROM.

Computer display terminals vary in configuration depending upon the particular application in which they re being used. For example, the bit rate of the data communications channel varies depending on the application and the channel number varies also. Often, the format of the visual display must be varied depending on the particular application in which the terminal is being used. Thus, it is practical to manufacture a general purpose terminal and configure it to its particular application in the field. This has been done historically by disassembling the terminal in the field, cutting paths (wires) and soldering in additional jumper wires, and then reassembling the terminal. Such a procedure is time consuming and also provides the opportunity for accidental hardware damage to the terminal due to human error. Furthermore, once a terminal is uniquely configured, as above described, the interchangeability of two terminals, each having a unique configuration, is not easily accomplished.

In general, non-volatile memories such as magnetic core memories, magnetic tape memories and magnetic disc memories are known. Such memories are commonly used in computer systems for long-term storage with power off. Also, EAROMs, electrically alterable read only memories, are known.

SUMMARY OF THE INVENTION

The present invention provides a general purpose intelligent display terminal that can be easily configured or reconfigured to a specific purpose. The present invention, like prior art display terminals, has a microprocessing unit, a display that interfaces with the microprocessing unit, a data communications channel that interfaces with the microprocessing unit and a keyboard or other means for inputting information into the microprocessing unit. The present invention, unlike the known prior art display terminals, has a non-volatile read/write memory that interfaces with the microprocessing unit. Such memory stores the display terminal configuration during power off.

An intelligent display terminal according to the present invention is capable of receiving character data information from an external computer and providing a visual display of linguistic characters in response to such character data information. The terminal includes a microprocessing unit comprised of a data processor, a non-volatile ROM for providing instruction codes, and a volatile RAM for temporary storage of data. A data communications means interfaces with the microprocessor unit, receives the character information from the external computer, and provides such character information to the microprocessor unit for storage in its RAM. A display means interfaces with the microprocessor unit and visually displays linguistic characters stored in the RAM of the microprocessor unit. The terminal has the capability to be semipermanently configured in response to externally supplied configuration information. The terminal includes an input means that interfaces with the microprocessor unit. Such input means provides a means for inputting the externally supplied configuration information into the microprocessor unit. A non-volatile read/write memory means interfaces with the microprocessor unit and receives the configuration information from the microprocessor unit for semipermanent storage. Such memory means is non-volatile at power off; and the memory means supplies its stored configuration information to the microprocessor unit upon a request from the microprocessor unit for the information.

In the preferred embodiment, the data communications means includes a two wire, direct communications channel to an external computer. The display means includes a CRT (cathode ray tube) display. The input means includes a manually-actuated typewriter type keyboard, and the non-volatile read/write memory means includes an EAROM (an Electrically Alterable Read Only Memory).

The present invention provides a display terminal that is easily, efficiently, and semipermanently configured from a general purpose display terminal to a specific purpose display terminal. The memory means of the display terminal may contain the configuration information, is electrically changeable via the microprocessor unit while power is on, and is non-volatile (non-destructable) during power off. Thus, the information stored in the memory means is semipermanent in the sense that it is permanently stored during power off, but electrically changeable when configuration changes are desired.

The present invention provides a very flexible and easily configured display terminal. For example, the address number and bit rate of the communications channel (to the external computer) may be easily changed. Similarly, the format of a CRT or other display may be easily changed to provide different numbers of horizontal lines per page or different numbers of linquistic characters per line. Thus, it can be seen that the present invention provides a capability to configure a general purpose display terminal to a variety of specific purposes.

DETAILED DESCRIPTION OF THE INVENTION

Figure 1:
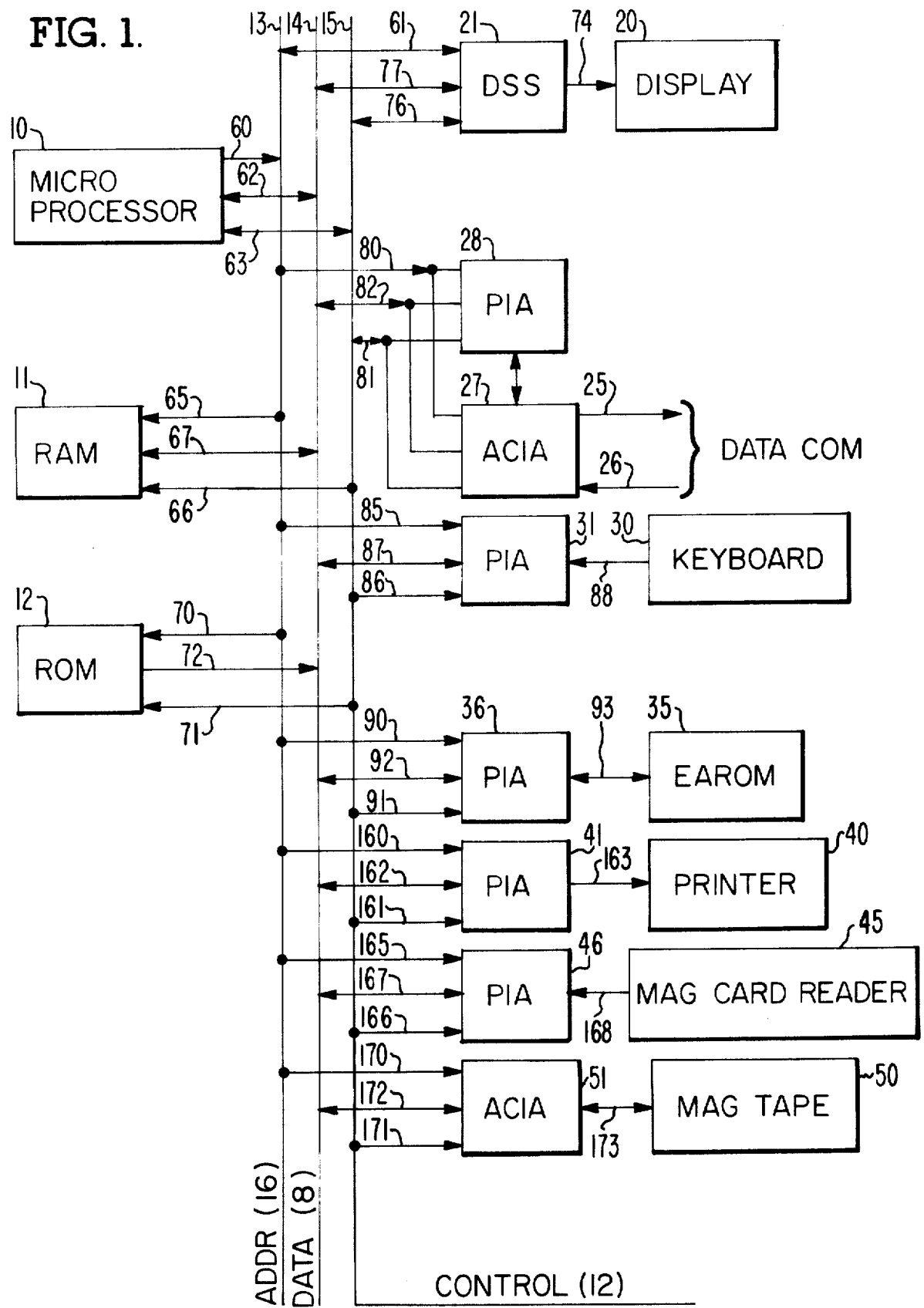
FIG. 1 is a block diagram of an intelligent display terminal according to the present invention.

A block diagram of a configurable computer display terminal according to the present invention is shown in FIG. 1. Briefly, the display terminal includes a microprocessor unit formed by a microprocessor 10, a RAM 11 and a ROM 12 which are interconnected by a common address bus 13, a common data bus 14 and a common control bus 15. A display 20, such as a cathode ray tube, interfaces with the common buses 13, 14 and 15 via a display subsystem 21. The display 20 functions to provide a visual display of linguistic characters stored in the RAM 11. A data communications channel designated by conductors 25 and 26 interfaces with the common buses 13, 14 and 15 via an ACIA (Asynchronous Communications Interface Adapter) 27 and a PIA (Peripheral Interface Adapter) 28. The data communications channel provides communication with an external computer such that the external computer can provide character information to the terminal for visual display. A keyboard 30 interfaces with the common buses 13, 14 and 15 via a PIA 31. The keyboard can be used to manually input information into the terminal for display, operator control of the terminal and/or transmission to the external computer, for example. An EAROM 35 interfaces with the common buses 13, 14 and 15 via a PIA 36. The EAROM provides non-volatile read/write memory for storing terminal configuration information when power is not applied to the terminal electronics. An external printer 40 interfaces with the common buses 13, 14 and 15 via an internal PIA 41. The printer 40 can provide hard copies of information shown on the display 20. An external magnetic card reader 45 interfaces with the common buses 13, 14 and 15 via an internal PIA 46. The PIA 46 provides an auxiliary method of inputting information into the terminal. An external magnetic tape cassette unit 50 interfaces with the common buses 13, 14 and 15 via an internal PIA 51. The PIA 51 provides an auxiliary method of inputting and outputting information from the terminal.

More particularly, the microprocessor 10 of the microprocessor unit may be a Motorola 6800. Such a microprocessor provides an interface of 16 address lines (designated as bus 13), 8 data lines (designated as bus 14) and 12 control lines (designated as bus 15). The microprocessor 10 operates at a 1 MHz cycle rate and utilizes a two phase clock with each phase approximately 500 nSec wide. During clock phase two, the microprocessor 10 controls the address bus 13 via path 60; and during clock phase one, the display subsystem 21 controls the address bus 13 via path 61. The microprocessor 10 may either receive or transmit data to data bus 14 via path 62 depending on the instruction the microprocessor is executing. The microprocessor 10 may either transmit control signals via path 63 or receive control signals (such as for example an interrupt) via path 63.

The RAM 11 is a read/write memory that is volatile (contents destroyed) at power off. The RAM provides temporary storage of data for various purposes while the terminal is in operation. The RAM is a random access memory, and receives address and control signals on paths 65 and 66, respectively. Data is received and transmitted from the RAM to the bus 14 via path 67 during respective write and read cycles as determined by the address signals on paths 65 and the control signals on path 66. The RAM may, for example, have 8K words with each word having 8 bits. The RAM may be formed by an array of 16 appropriately decoded Mostek RAM chips each 4K by one bit in dimension.

The ROM 12 is a read only memory that is nonvolatile (contents saved) at power off. The ROM provides permanent storage for instruction codes used by the microprocessor 10. The ROM is a random access memory, receives address and control signals on paths 70 and 71, respectively, and in response thereto provides data signals (instruction codes) to data bus 14 via path 72. The ROM, for example, may have 20K words with each word having 8 bits. The information stored in the ROM may, for example, be either masked in during manufacture or burned in after manufacture.

The display 20 interfaces with the microprocessor unit via display subsystem 21. The display 20 may, for example, be a CRT (cathode ray tube) display. Alternatively, the display could be a Burroughs SELF-SCAN ® display which is formed by a matrix of selectively energizable light sources.

The display subsystem 21 can be a nonintelligent controller type apparatus that takes character data from an area of the RAM 11 (designated as a display buffer) during microprocessor clock phase 1, and in turn provides signals to the display via path 74. The display subsystem receives clock phase control via path 76, transmits address and control signals to the RAM 11 via path 61 and path 76, respectively, during clock phase 1, and receives its data information from the RAM in 8 bit ASCII words via path 77. The display subsystem can interface with the buses 13, 14 and 15 using tristate transceivers; such transceivers provide a high impedance when receiving data or unused, and provide a low impedance logical 1 or logical 0 when transmitting. For convenience, the display buffer within the RAM 11 can be arranged with a fixed location pointer table that points to where an actual line of character data is in the RAM buffer such that character data is relocatable within the RAM on a line by line basis for edit purposes.

If the display 20 is a CRT, then the display subsystem may utilize a raster scan technique wherein several horizontal scans, such as 12, are utilized to provide a row of, for example, 80 characters on the screen. The subsystem 21 may contain two line buffers with each buffer being at least 80 words long and 8 bits wide. Each line buffer can store the ASCII codes for one line to be displayed on the CRT. The two buffers are operated in ping-pong fashion, that is, while one is being used to display information on the CRT, the other is being reloaded for the next line of the display. It may, for example, take 12 scans to provide one line of characters on the CRT with each scan taking approximately 42 microseconds of display scan time plus 10 microseconds of flyback scan time. During the 12 flyback times, the buffer not currently being displayed can be loaded during clock phase 1 from the RAM such that it is full and ready to go before the scanning of the previous line is complete. The ASCII codes from the line buffer are sequentially fed to a conventional ROM type symbol generator together with the scan line indication (1 to 12) and a clock rate. The symbol generator in turn supplies a sequence of ones and zeros representative of the appropriate slice of the characters in that line. Thus, each of the 80 characters of the line to be displayed is input to the symbol generator 12 times to provide 12 beam scans to form the desired line of characters on the CRT.

If the display 20 is a cathode ray tube, the display subsystem previously described forms a means for electronically interfacing the cathode ray tube to the RAM of the microprocessing unit; and such means together with the CRT form the display means of the preferred embodiment.

If the display 20 is a SELF-SCAN ® type display of selectively energizable light sources, a display subsystem similar to that described provides a means for interfacing that display to the RAM of the microprocessor unit; and such means together with the display forms on the display means of that embodiment.

The data communications channel designated by the conductors 25 and 26 interfaces with the microprocessor unit via ACIA 27 and PIA 28. ACIA 27 may be a Motorola 6850 Asynchronous Communications Interface Adapter and PIA 28 may be a Motorola 6820 Peripheral Interface Adapter. Alternatively, ACIA 27 could be replaced by an American Micro Systems S2350 Universal Synchronous Receiver or Transmitter, if desired. PIA 28 provides format control for ACIA 27. ACIA 27 converts the communication data from parallel to serial and transmits it at the appropriate bit rate, as well as receiving serial data via conductors 25 and 26 and converting it to parallel data for input to the microprocessor unit. Address and control information are provided to the ACIA 27 and the PIA 28 via paths 80 and 81, respectively. 8 bit parallel data is transmitted to and from the ACIA 27 and PIA 28 via path 82. Control path 81 also transmits an interrupt signal from the data communications channel back to the microprocessor 10 so that the communications channel can be serviced upon demand and not unduly slow down the external computer connected to the communications channel. The ACIA 27 and PIA 28 form a means for electronically interfacing the data communications channel to the microprocessor unit; and such means together with the data communications channel form the data communication means of the preferred embodiment. Such data communication means receives character information from the external computer and transmits it to the microprocessing unit so that the character information can be stored in the RAM.

The keyboard 30 interfaces with the microprocessor unit via PIA 31 which may be a Motorola 6820. PIA 31 receives address and control information from the microprocessor unit via paths 85 and 86. Data is transmitted to and from PIA 31 via path 87. The keyboard provides signals to PIA 31 via path 88. The keyboard data is input to the microprocessor unit utilizing a polling technique; that is, the microprocessor 10 regularly interrogates the PIA 31 to determine whether it has data to be input. The PIA 31 forms a means for electronically interfacing the keyboard to the microprocessing unit; and such means and the keyborad 30 together form the input means of the preferred embodiment. Such input means supplies external configuration information to the microprocessor unit.

Alternatively, the input means for providing external configuration information to the microprocessor unit could be provided by the data communications channel previously described, the magnetic card reader PIA 46, or the magnetic tape cassette ACIA 51, for example.

The EAROM 35 interfaces with the microprocessor unit via PIA 36. PIA 36 receives address and control information from the microprocessor unit via paths 90 and 91. Data is transmitted to and from PIA 36 via path 92. Information is transmitted to and from the EAROM 35 by path 93.

Figure 2:
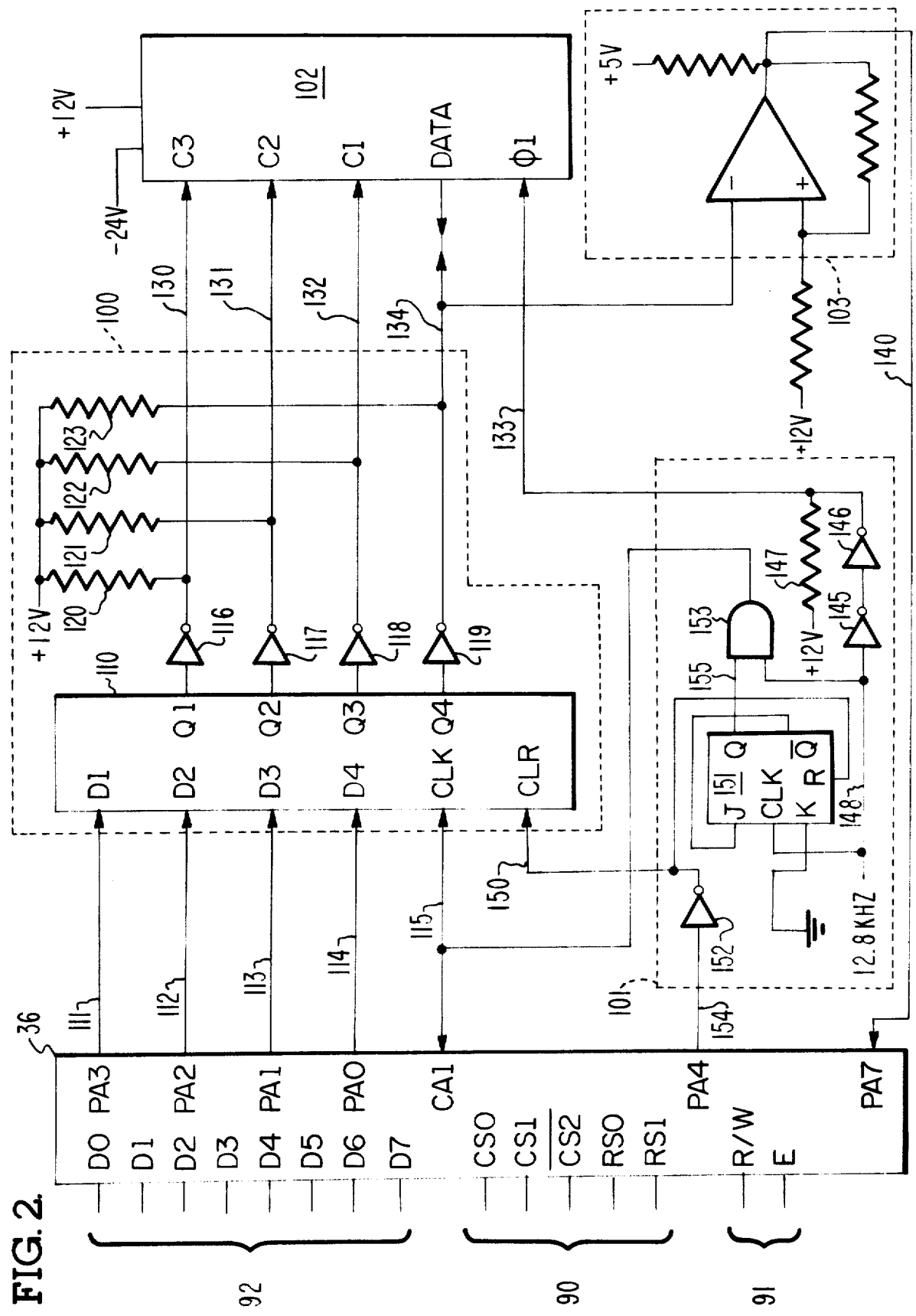
FIG. 2 is a detailed block diagram of the EAROM block of FIG. 1 together with its associated PIA.

FIG. 2 shows in more detail the PIA 36; and the circuits 100, 101, 102 and 103 which form the EAROM 35.

PIA 36 may be a Motorola 6820. D0 through D7 are the 8 bit data bus 14; CS0, CS1, $\overline{CS2}$, RS0 and RS1 are from the address bus 13 with the exception that $\overline{CS2}$ is suitably decoded as required; and R/W and E are from the control bus 15 of the microprocessing unit. PA0 through PA4 and PA7 are the data input/output lines. PA0 provides the serial data to be stored in the EAROM, PA1 through PA3 provide format control to the EAROM, PA4 provides timing control for data transfers to and from the EAROM, and PA7 receives serial data from the EAROM. CA1 is an interrupt input which sets a status flag bit within the PIA 36.

The EAROM 35 is formed by the storage circuit 100, the synchronizing timing circuit 101, the memory chip 102 and the Schmitt trigger circuit 103.

The storage circuit 100 includes a 4 bit latch 110 which may be a 74175 TTL type D latch (TTL Data Book, Second Edition, Texas Instruments, Copyright 1976, P.7–253). The latch stores the control signals on conductors 111, 112, and 113, and the data signal on conductor 114 on the rising edge of the clock on conductor 115. The open collector gates 116 through 119 invert the latch output and the pull up resistors 120 through 123 raise the logical levels to be compatible with the memory chip 102.

The memory chip 102 may be a General Instruments 1400 which is an electrically alterable read only memory chip. The chip has 100 words of data storage with each word being 14 bits long. Data transfers to and from the chip are controlled by control signals on conductors 130 through 132 and a clock signal on conductor 133. The actual data transfer to and from the chip 102 occurs serially on conductor 134; and such data transfer may contain address information or the data itself. The chip 102 provides a read/write memory that is non-volatile (non-destructive) at power off.

The Schmitt trigger circuit 103 detects the signal levels on conductor 134 and converts such signal levels to TTL logic levels at conductor 140 for input to PIA 36. The circuit 103 may be provided by an LM 311 (Linear Control Circuits Data Book, First Edition, Texas Instruments, Copyright 1976, p.157 suitably biased and having hysteresis feedback.

The synchronizing timing circuit 101 provides the clock on conductor 133 for the chip 102 and the clock on conductor 115 for the latch 110 and the PIA 36.

The clock on conductor 133 is a 12.8 KHz free running clock. It is provided by gates 145 and 146 and pull up resistor 147 in response to a free running 12.8 KHz on conductor 148.

The clock on conductor 115 and the clear on conductor 150 are provided by J–K flip flop 151, inverter 152 and AND gate 153 in response to timing control via conductor 154. When a logical 1 exists on conductor 154; latch 110 and flip flop 151 are reset via conductor 150, and conductor 115 has a logical 0. Thereafter, following the changing of the signal on conductor 154 to a logical 0, the next falling edge on conductor 148 will provide a logical 1 on conductor 155 to enable gate 153. Starting on the following rising edge of the free running clock on conductor 148, AND gate 153 will provide a sequence of 40 microseconds wide pulses on conductor 115 until the synchronizing timing circuit is disabled by returning conductor 154 to a logical 1. Thus, the micoprocessing unit controls the synchronizing timing circuit via conductor 154, and monitors the status of the synchronizing clock pulses via conductor 115 which is input to CA1 of PIA 36.

As previously described, the chip 102 in conjunction with storage 100, timing 101 and Schmitt trigger 103 provides the EAROM 35. PIA 36 provides means for interfacing such electrically alterable read only memory to the microprocessing unit; and the circuitry of FIG. 2 as a unit provides the memory means of the preferred embodiment. Alternatively, a magnetic core memory, suitably interfaced to the microprocessing unit, could replace the EAROM 35 of the memory means. As previously described, the memory means interfaces with the microprocessor unit, receives and stores configuration information from the microprocessor unit, and provides the stored configuration information to the microprocessor unit upon request.

Referring again to FIG. 1, the external printer 40 interfaces with the microprocessor unit via internal PIA 41. PIA 41 receives address and control information via paths 160 and 161. Data is transmitted to and from PIA 41 via path 162. The printer 40 receives signals from PIA 41 via path 163. The printer provides hard copies of the contents of the visual display 20 when such copies are desired. During a printing operation, the microprocessor 10 regularly polls (interrogates) the printer PIA 41 to determine whether the printer is ready to accept the next character to be printed.

The external magnetic card reader 45 interfaces with the microprocessor unit via internal PIA 46. PIA 46 receives address and control information via paths 165 and 166. Data is transmitted to and from PIA 46 via path 167. The card reader 45 provides signals to PIA 46 via path 168. The card reader provides an additional apparatus for inputting information into the microprocessing unit of the display terminal, and PIA 46 may alternatively form the input means of the preferred embodiment.

The external magnetic cassette tape unit 50 interfaces with the microprocessor unit via internal ACIA 51. ACIA 51 receives address and control information via paths 170 and 171. Data is transmitted to and from ACIA 51 via path 172. The magnetic tape unit 50 communicates with ACIA 51 via path 173. The magnetic tape unit 50 provides additional apparatus for inputting information to and receiving information from the microprocessing unit of the display terminal; and ACIA 51 may alternatively form the input means of the preferred embodiment.

To provide a more complete understanding of the operation of the display terminal of FIG. 1, a brief description of the contents of the RAM 11 and the ROM 12 will be provided.

Various areas of the RAM 11 are designated for specific purposes. A display buffer area stores character data to be displayed on display 20; and a display pointer table area indicates where each line of data is within the display buffer. Each of the other peripheral devices has a buffer for temporarily storing data to be transmitted to or recently received from that device. For example, there is a data communication buffer area, a keyboard buffer area, a printer buffer area, a magnetic card reader buffer area, and a magnetic tape unit buffer area. In addition, there is a configuration buffer area in which configuration information is stored during normal terminal operation. The configuration buffer is normally loaded from the EAROM 35 when the terminal is powered up.

Various areas of the ROM 12 have instruction code routines to perform specific functions. There is, for examaple, an operating system, a table of fixed constants, an edit routine, a data communication routine, a keyboard routine, an EAROM routine, a printer routine, a magnetic card reader routine and a magnetic tape cassette routine.

Briefly, the operating system routine controls the selection and operation of the other routines.

The operating system gives first priority to the data communications channel. Whenever the data communications channel sends an interrupt to the microprocessor 10 indicating it needs servicing, the microprocessor borrows a brief time slot from whatever other routine it is running and inputs or outputs data between the data communications channel and the data communications buffer in the RAM. In this manner, the terminal does not unnecessarily slow down the external computer connected to the data communications channel.

The other peripheral devices (such as the keyboard 30, printer 40, magnetic card reader 45 and magnetic tape unit 50) are serviced on a status checking basis. The microprocessor 10 receives a lower level real time interrupt every one millisecond. The operating system breaks each millisecond up into two approximately equal sections. During the first section of time, referred to as the foreground program, actual outputting and inputting of data to and from the peripherals occurs. Briefly, the operating system keeps a table of the peripherals that are active. During the first section of time, the status of the active devices is checked in round robin fashion; and if a particular peripheral needs service, data is appropriately transmitted to or from that peripheral. During the second section of time, referred to as the background program, background data processing occurs within the microprocessor unit itself. Such background data processing includes functions such as updating the table of active peripherals; placing data to be transmitted in the data communictions buffer, the printer buffer of the tape unit buffer; and removing received data from the data communications buffer, keyboard buffer, magnetic card reader buffer and tape unit buffer and performing processing functions thereon.

The EAROM routine in the ROM 12 is utilized to transmit and receive data from the EAROM 35 in an off-line mode. Whenever the terminal is powered up, the operating system calls an EAROM subroutine which transfers the configuration information in EAROM 35 to the configuration buffer in the RAM 11. Such subroutine also appropriately formats the data. Thereafter, the microprocessor 10 has high speed access to this configuration data.

The EAROM may be reconfigured by typing on the keyboard. First, control codes are typed on the keyboard to move the configuration information from the configuration area of the RAM 11 to the display area of the RAM 11 such that the configuration information is observed on the display 20. Then, the contents of the display RAM can be edited from the keyboard while observing the edit results on the display. Next, control codes are typed on the keyboard to move the configuration information from the display area of the RAM to the configuration area of the RAM. Then, control codes are typed on the keyboard to call the EAROM subroutine which in an off-line mode transfers the configuration information in the configuration area of the RAM to the EAROM 35. Such subroutine, of course, appropriately formats the data. Thereafter, upon power up or upon other microprocessor request, the new EAROM contents can be transferred into the RAM.

What is claimed is:

1. An intelligent display terminal for receiving character data information from an external computer and providing a visual display of linguistic characters in response to such character data information, said display terminal having the capability to be semipermanently configured in response to externally supplied configuration information and comprising;

a microprocessing unit comprising an electronic data processor, a read only memory that is nonvolatile at power off for providing instruction codes for said processor, and a read/write memory that is volatile at power off for providing temporary storage for data;

data communication means that interface with said microprocessing unit, said data communication means for receiving the character information from the external computer at a given bit rate and providing said character information to said microprocessing unit so that the character information can be stored in the volatile read/write memory of said microprocessing unit;

visual display means that interface with said microprocessing unit, said visual display means for visually displaying linguistic characters stored in the volatile read/write memory of said microprocessing unit;

input means that interface with said microprocessing unit, said input means for inputting said externally supplied configuration information including the bit rate of the data communication means into said microprocessing unit; and electrically alterable read only memory means that interface with said microprocessing unit, said electrically alterable read only memory means for receiving and storing the bit rate of the data communication means from said microprocessing unit and for providing the stored bit rate to said microprocessing unit upon request therefor, said electrically alterable read only memory means being nonvolatile at power off.

2. The display terminal according to claim 1 wherein said data communication means has an address number assigned to it;

said input means inputs the address number into the microprocessing unit; and said electrically alterable read only memory means receives said address number from said microprocessing unit, nonvolatilely stores said address number during power off, and provides said address number to said microprocessing unit upon request therefor.

3. The display terminal according to claim 2 wherein said electrically alterable read only memory means comprises an electrically alterable read only memory; and interface means for electronically interfacing said electrically alterable read only memory to said microprocessing unit.

4. The display terminal according to claim 2 wherein said visual display means comprises:

a cathode ray tube; and means for electronically interfacing said cathode ray tube to the volatile read/write memory of said microprocessing unit.

5. The display terminal according to claim 2 wherein said visual display means comprises:

a matrix of selectably energizable light sources; and means for electronically interfacing said matrix of light sources to the volatile read/write memory of said microprocessing unit.

6. The display terminal according to claim 2 wherein said input means comprises: :

a keyboard; and means for electronically interfacing said keyboard to said microprocessing unit.

7. The display terminal according to claim 2 wherein said input means comprises:

a data communications channel; and means for electronically interfacing said data communications channel to said microprocessing unit.

8. The display terminal according to claim 2 wherein said data communication means comprises:

a data communication channel; and means for electronically interfacing said data communication channel to said microprocessing unit.

9. The display terminal according to claim 2 wherein:

said data communication means comprises: a data communications channel; and means for interfacing said data communications channel to said microprocessing unit; and said visual display means comprises: a cathode ray tube; and means for electronically interfacing said cathode ray tube to the volatile read/write memory of said microprocessing unit.

10. The display terminal according to claim 9 wherein said input means comprises:

a keyboard; and means for electronically interfacing said keyboard to said microprocessing unit.

* * * * *